United States Patent
Tisdale (10) Patent No.: US 10,093,155 B2
(45) Date of Patent: Oct. 9, 2018

(54) SHADING DEVICE

(71) Applicant: Roy Calvin Tisdale, Las Vegas, NV (US)

(72) Inventor: Roy Calvin Tisdale, Las Vegas, NV (US)

(*) Notice: Subject to any disclaimer, the term of this patent is extended or adjusted under 35 U.S.C. 154(b) by 243 days.

(21) Appl. No.: 14/961,567

(22) Filed: Dec. 7, 2015

(65) Prior Publication Data

US 2017/0158031 A1 Jun. 8, 2017

(51) Int. Cl.
*B60J 1/20* (2006.01)

(52) U.S. Cl.
CPC ........... *B60J 1/2013* (2013.01); *B60J 1/2038* (2013.01); *B60J 1/2041* (2013.01); *B60J 1/2077* (2013.01)

(58) Field of Classification Search
CPC .............................. B60J 1/2013; B60J 1/2077
USPC ..... 296/97.1, 97.4, 97.8; 160/370.22, 370.21
See application file for complete search history.

(56) References Cited

U.S. PATENT DOCUMENTS

| | | | | |
|---|---|---|---|---|
| 5,645,119 A * | 7/1997 | Caruso | ................... | B60J 1/2091 160/178.1 R |
| 6,086,133 A * | 7/2000 | Alonso | ................... | B60J 1/2019 160/23.1 |
| 8,869,870 B2 * | 10/2014 | Wieczorek | ............. | B60J 1/2013 160/31 |
| 2002/0033616 A1 * | 3/2002 | Schlecht | ................ | B60J 1/2027 296/138 |
| 2002/0059989 A1 * | 5/2002 | Schlecht | ................ | B60J 1/2027 160/265 |
| 2016/0129765 A1 * | 5/2016 | Taad | ....................... | B60J 1/2063 160/311 |

* cited by examiner

*Primary Examiner* — Ruth Ilan (57) ABSTRACT

A shading device provides controllable shade and privacy in an interior region of a vehicle by extending and retracting panels and telescopic ribs across a window of a vehicle, while also widening and narrowing the panels and telescopic ribs in conformance to the width of the window. The panels and telescopic ribs form a coplanar surface that rides along a track portion on the lateral edges of the window. The panels are resilient so as to stretch for accommodating the changing width of the window. The telescopic ribs are length adjustable so as to accommodate the changing width of the window. A housing portion carries the panels and telescopic ribs across the window. A control portion operates the motor of housing portion. A mirror portion attaches to an interior region of the vehicle to operate while out of the path of the panels and telescopic ribs.

19 Claims, 7 Drawing Sheets

SHADING DEVICE

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

An embodiment of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a shading device for overlaying a window of a vehicle. More particularly, the invention relates to a shading device that is configured to overlay a windshield of a vehicle for providing shade and privacy by extending and retracting a pair of panels and a plurality of telescopic ribs across the windshield, while also widening and narrowing the panels and ribs in conformance to the width of the windshield.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that a front windshield of a vehicle, such as an aircraft, automobile, bus, motorbike or boat is the front window through which a vehicle operator looks through facing forward. Modern windshields are generally made of laminated safety glass, a type of treated glass, which consists of two curved sheets of glass with a plastic layer laminated between them for safety, and are bonded into the window frame.

It is known that in a hot and sunny environment, sunlight through the windshield of a parked vehicle increases the interior temperature and damages the fabric of the dashboard and front seats. Also, since the windshield is transparent, privacy is generally not possible inside the vehicle.

Typically, a vehicle windshield sunshield is used to block sun rays passing through the windshield of a motor vehicle. The sunshield is often a cardboard panel that compacts when not in use, and folds out to cover a substantial portion of the windshield. Electrical sunshields are also used to automatically cover portions of the windshield, usually falling across the windshield from the roof to the dashboard.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A, 1B, and 1C illustrate perspective views of an exemplary shading device covering a window, where FIG. 1A illustrates an exemplary panel retracted to expose the window, FIG. 1B illustrates an exemplary housing portion paying out the panel while crossing the window, and FIG. 1C illustrates the panel fully covering the window, in accordance with an embodiment of the present invention;

FIGS. 4A and 4B illustrate close up view of a telescopic rib, where FIG. 4A illustrates the rib extending incrementally to accommodate a widening lateral perimeter of a window, and FIG. 4B illustrates an exemplary cavity of the telescopic rib containing an exemplary spring portion, in accordance with an embodiment of the present invention;

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight data aperture of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. §112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight data aperture of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings. There are various types of shading devices that enable controllable covering of a vehicle windshield to provide shade to the interior region of a vehicle that may be provided by preferred embodiments of the present invention.

In one embodiment of the present invention, a shading device may provide controllable covering of a window of a vehicle to provide shade to the interior region of a vehicle. The shading device may create an environment of shade and privacy in the interior region of a vehicle by extending and retracting a pair of panels and a plurality of telescopic ribs across the window, while also widening and narrowing the panels and telescopic ribs in conformance to the variable widths between the lateral perimeters of the window.

In some embodiments, the shading device may be configured to extend and retract a pair of panels and a plurality of telescopic ribs across a window of a vehicle, while also widening and narrowing the panels and ribs in conformance to the width of the window. The device may include a separate mirror portion that attaches to an interior region of the vehicle, so as to operate out of the path of the panels and telescopic ribs. The device may include a remotely positioned control portion for operation of the motor and housing portion. In one embodiment, the device is configured to controllably move up and down across a front windshield of a vehicle to shade an interior region of the vehicle from the sun or to inhibit visibility into the interior region of the vehicle.

In some embodiments, the device may include a pair of track portions for guiding the panels and ribs across the window. The pair of track portions may be disposed along the length of the lateral perimeters of the window. In one embodiment, the pair of track portions may include a pair of spaced-apart tracks that position along the lateral edges of the window, inside the vehicle. In one embodiment, the pair of track portions is disposed at an angle to follow the angled disposition of the lateral perimeters at the window.

The device may also provide a plurality of telescopic ribs that provide stability to the panels and also enable conformance to the width of the window. In some embodiments, the telescopic ribs may be disposed horizontally, and in a spaced-apart relationship across the length of the window. The telescopic ribs may be configured to length adjust between the lateral perimeters of the window while crossing the window. Each telescopic rib comprises a pair of rib ends that terminate at a track engagement member. The track engagement members may be configured to rotate freely and slidably engage the pair of track portions.

The telescopic ribs may further be defined by a cavity that is sized and dimensioned to contain a spring portion. The spring portion, while compressed inside the cavity, may be configured to exert a tension that biases the track engagement member outwardly and towards the rib ends. The spring portion enables the track engagement members to follow the path of the track portion. This is especially useful when the width of the track portion becomes wider or narrower.

In some embodiments, the device may further include a pair of panels that provide the surface area coverage across the window. The panels may include an outer panel and an inner panel that sandwich the telescopic ribs. Thus in this configuration, the panels and telescopic ribs may form a unitary, generally flat surface disposed coplanar to the window. The panels and the telescopic ribs may be attached, so as to move in unison across the window.

The panels provide the shading capacity of the device. The pair of panels may include an inner panel that engages the window and an outer panel that overlays the telescopic ribs. The panels may be configured to stretch. This type of resilience is especially useful for when the panels must follow the telescopic ribs as they extend and retract in conformance to the angle of the track portion.

The device may provide a housing portion having a housing cavity that contains the telescopic ribs and the panels. The housing portion may also include a pair of housing ends. The housing ends are configured to slidably engage the pair of track portions. The housing cavity may contain the telescopic ribs and the panel. The generally resilient configuration of the telescopic ribs and the panel enable them to roll up inside the housing portion.

In one embodiment, the housing portion may include a cylinder that draws in and pays out the telescopic ribs and panels while moving across the window. The telescopic ribs and panels roll up inside the housing cavity, forming about a 1″ diameter cylindrical shape when fully retracted and rolled up inside the housing cavity. A motor is integrated in the housing portion. The motor may actuate a pulley mechanism that rotatably moves the housing portion up and down the window while simultaneously paying out or drawing in the panels.

The device may include a separate mirror portion that attaches to an interior region of the vehicle, so as to operate out of the path of the panels and telescopic ribs. The device may further include a remotely positioned control portion for operation of the motor and housing portion. The control portion may include a power button that operatively connects to the motor of the housing portion.

Figure 1A:
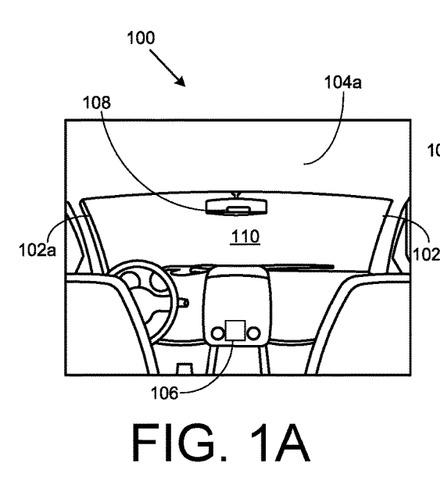
Figure 1B:
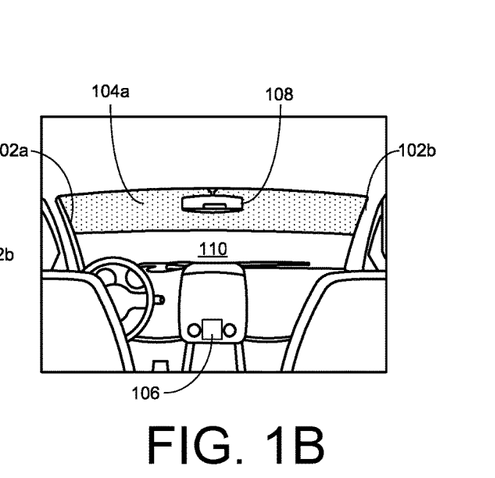
Figure 1C:
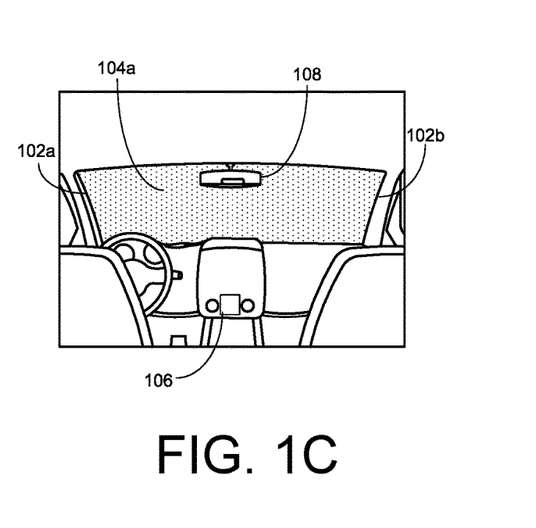

FIGS. 1A, 1B, and 1C illustrate perspective views of an exemplary shading device covering a window, where FIG. 1A illustrates an exemplary panel retracted to expose the window, FIG. 1B illustrates an exemplary housing portion paying out the panel while crossing the window, and FIG. 1C illustrates the panels fully covering the window, in accordance with an embodiment of the present invention.

In one aspect, a shading device 100 may provide controllable shade and privacy in an interior region of a vehicle by extending and retracting a pair of panels 104a, 104b and a plurality of telescopic ribs across a window 110 of a vehicle, while also widening and narrowing the panels and telescopic ribs in conformance to the variable widths between the lateral perimeters of the window.

In some embodiments, the device can be used on all windows of an automobile to include cars, trucks, tractor-trailers, tractors, etc. The device may also be used on all windows of boats, airplanes and trains. The device may be utilized on the windows of houses and buildings to include sliding glass doors. The device may be used on windows of different shapes to include oval, round and square.

In one embodiment, the window is a front windshield of a vehicle, whereby the windshield has angled lateral sides that taper in towards the roof of the vehicle, and widen out towards the dashboard of the vehicle. Though in other embodiments, the window may include, without limitation, a rear window of a vehicle, a side window of a vehicle, or any window having angled lateral sides.

In some embodiments, the device may comprise a pair of track portions 102a, 102b for helping to guide the panels and ribs across the window. The track portion may be disposed along the length of each lateral perimeter of the window. In one embodiment, the pair of track portions may include a pair of spaced-apart tracks that position along the lateral edges of the window, inside the vehicle. In one embodiment, the pair of track portions is disposed at an angle to follow the angled disposition of the lateral perimeters at the window. The track portions may include a slot for receiving a pair of track engagement members that extend from the ends of the telescopic ribs. The slot is configured to enable sliding along the length of the track portions.

In some embodiments, the panels may include an outer panel and an inner panel that sandwich the telescopic ribs. Thus in this configuration, the panels and telescopic ribs may form a unitary, generally flat surface disposed coplanar to the window. The rib ends of the telescopic ribs comprises spring-biased track engagement members that slidably engage the track portion up and down the window. In this manner, the telescopic ribs and the panels may ride along the track portion positioned on the lateral perimeters of the window. In the main embodiment of the invention the "track engagement members" are small wheels. However, a track-and-wedge system could be used as well as a tongue-and-groove like system.

In some embodiments, the panels provide shade against the sun, and also restrict visibility inside the vehicle. The panels may be shaped and dimensioned to match the width and height of the window, while taking into account curvature of the window. The panels may be sufficiently resilient so as to stretch for accommodating the changing width of the window. Suitable materials for the panels may include, without limitation, woven polyester, a nylon, a transparent fabric, cotton, canvas, leather, and any combination of these and/or other materials.

In other embodiments, the panels may be made in varieties intended for filtering sunlight and sun glare while its hosting vehicle is operating, and in which would the fabric shade be made in a translucent format. In such variation, the fabric shade can be made in various visible light transmission (VLT) percentages. Further, in one alternative embodiment, the panels may be fabricated in various colors, and may bear various designs, images, and logos. In some embodiments, the panels may be fabricated from all natural and synthetic fabrics, genuine and artificial leather such as Naugahyde™, as well as various films and tints.

In some embodiments, the telescopic ribs may be length adjustable so as to accommodate the changing width of the window. The telescopic ribs may include high density polyethylene (HDPE) cylindrically shaped rods that extend fully across the length of the window. The telescopic ribs are sufficiently flexible, so as to bend with the curvature of the window. Suitable materials for the telescopic ribs may include, without limitation, HDPE, a flexible polymer, aluminum, fiberglass, and wood. Though in other embodiments, the telescopic ribs may be of wire format, in which could various metals be used, or in a plastic format, in which could various durable plastics, including but not limited to polyvinyl chloride (PVC), be used.

FIG. 1A illustrates the panels and ribs fully retracted in the housing portion and the window fully exposed. In his position, the window is visible and a vehicle operator may operate the vehicle with a clear view. FIG. 1B illustrates the panel and telescopic ribs sliding down the window. As the lateral perimeter of the window widens, the telescopic ribs extend in length and the panels stretch. Conversely, as the lateral perimeters narrow, the telescopic ribs retract and the panel returns to a natural position. FIG. 1C illustrates the panels and telescopic ribs fully overlaying the window. Here, the interior region of the vehicle is shaded and provided with privacy.

In some embodiments, the device may include a remotely positioned control portion 106 for operation of the motor and housing portion. In one embodiment, the control portion may include a switch that is disposed within reach of a vehicle operator. In some embodiments, the control portion may be positioned on the dashboard or door of the vehicle. The control portion may be operatively connected to the vehicle battery and the motor that operates the panels and telescopic ribs. The panel may also be controlled through a motor of the panel being instigated by knob, switch or button. Also the panel could be lowered and raised via a turning handle the user would manually operate.

In one embodiment, the control portion has speed variable controls for enhanced controllability of the panels and telescopic ribs as they move up and down across the window. In one embodiment, the device provides panels and telescopic ribs that move up and down across the front windshield of a vehicle to shade an interior region of the vehicle from the sun or to inhibit visibility into the interior region of the vehicle.

In some embodiments, the device may also include a separate mirror portion 108 that attaches to an interior region of the vehicle. The mirror portion may include a rearview mirror that attaches to the roof of the vehicle, away from the perimeter of the window. By positioning the mirror portion in this disposition, the panels and telescopic ribs are not obstructed by the mirror portion. In one possible embodiment, the mirror portion is connected through a long curved arm made of clear plastic to the inside roof of the vehicle at the center top of the windshield. The connecting arm is clear plastic as not to interfere with the vehicle operator's line of sight.

Figure 2:
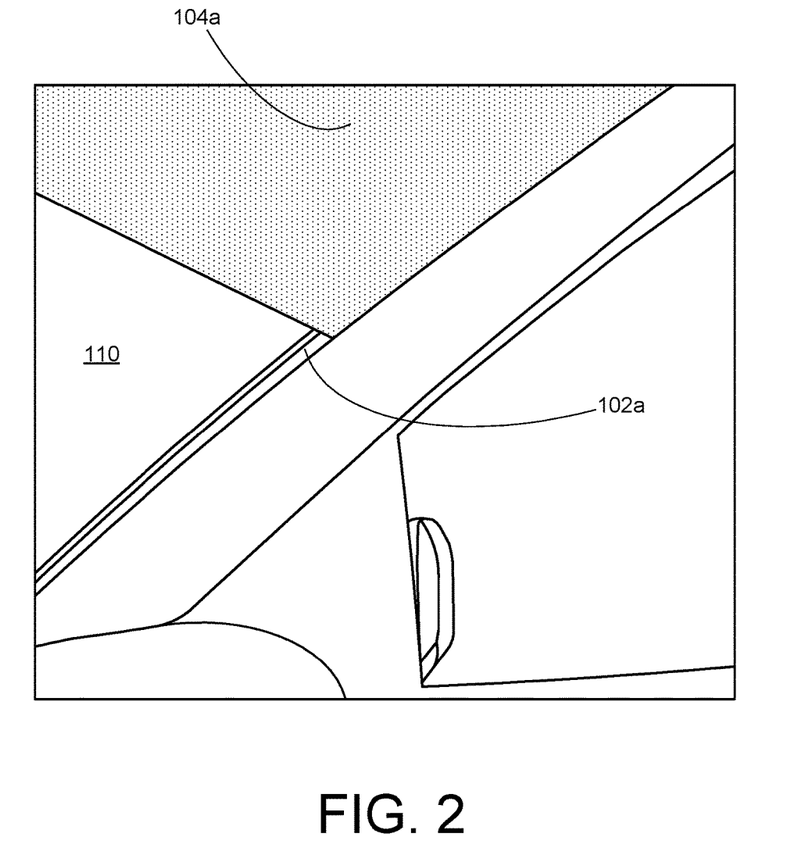
FIG. 2 illustrates a close up view of an exemplary panel partially shading an interior region of a vehicle, in accordance with an embodiment of the present invention.

FIG. 2 illustrates a close up view of an exemplary panel partially shading an interior region of a vehicle, in accordance with an embodiment of the present invention. In one aspect, the device does not require manual application and removal, unlike ordinary separate shading devices. The device may be integrated permanently into the vehicle. In some embodiments, the device may vary to accommodate individual motor vehicles in which it is featured, including but not limited to particular windshield dimensions, power capacities, and spatial layouts of dashboards.

Figure 3:
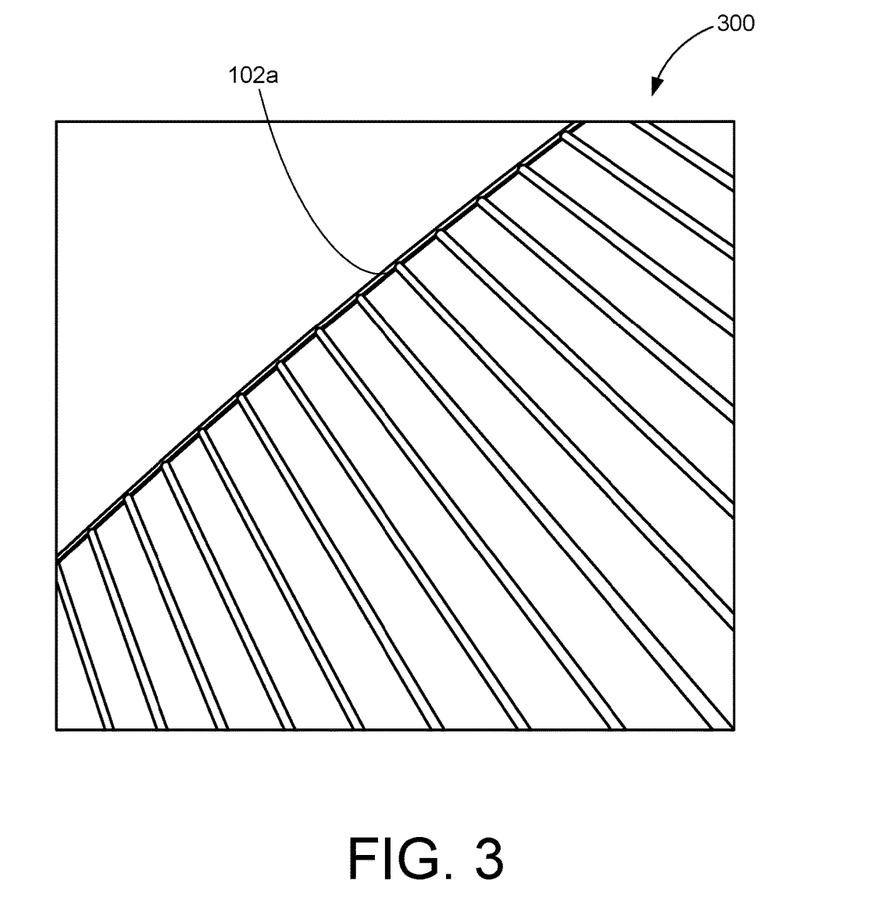
FIG. 3 illustrates a perspective view of an exemplary plurality of telescopic ribs engaging an exemplary track portion, in accordance with an embodiment of the present invention.

FIG. 3 illustrates a perspective view of an exemplary plurality of telescopic ribs engaging an exemplary track portion, in accordance with an embodiment of the present invention. In one aspect, the device may also include a plurality telescopic ribs 300 that provide stability to the panels and also enable conformance to the width of the window. In some embodiments, the telescopic ribs may be disposed horizontally, and in a spaced-apart relationship across the length of the window. The telescopic ribs may be configured to length adjust between the lateral perimeters of the window while crossing the window. A spring-biased mechanism enables the telescopic ribs to easily conform to changing widths across the window while moving up and down the window.

Figure 4A:
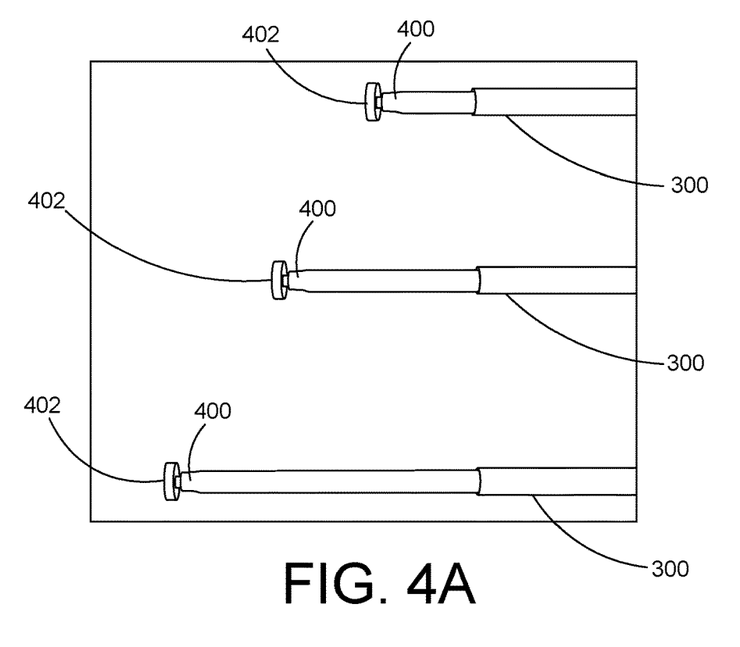
Figure 4B:
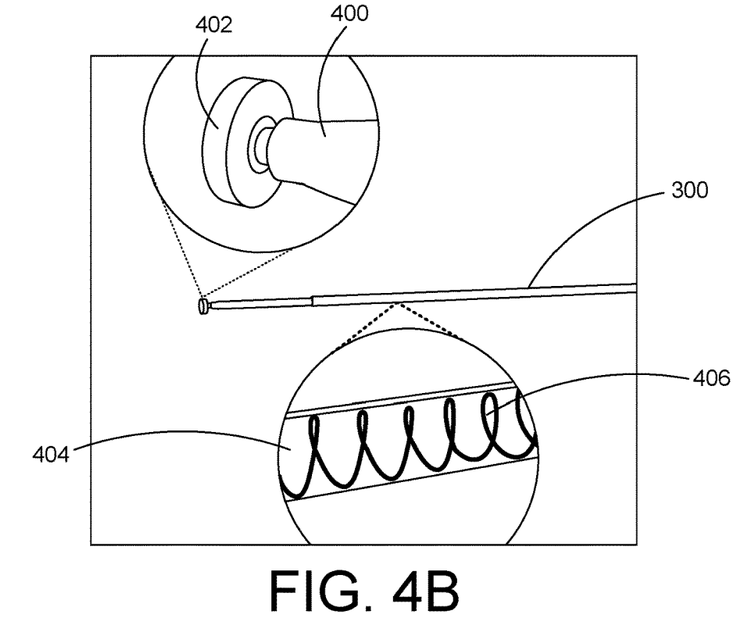

FIGS. 4A and 4B illustrate close up view of a telescopic rib, where FIG. 4A illustrates the rib extending incrementally to accommodate a widening lateral perimeter of a window, and FIG. 4B illustrates an exemplary cavity of the telescopic rib containing an exemplary spring portion, in accordance with an embodiment of the present invention. In one aspect, each telescopic rib comprises a pair of rib ends 400 that terminate at a track engagement member 402. The track engagement members may be configured to rotate freely and slidably engage the track portion, so as to enable the telescopic ribs and the attached panels to move across the window. In one embodiment, the track engagement portion is a rotating metal disc that is sized and dimensioned to fit inside a slot in the track portion.

In some embodiments, each telescopic rib may also be defined by a cavity 404. The cavity is generally elongated and configured to contain a spring portion 406. The spring portion, while compressed inside the cavity of the telescopic rib, may be configured to exert a tension that biases the track engagement member outwardly and towards the ends of the ribs. By pushing the track engagement members outwardly from the rib ends, the spring portion enables the track engagement members to follow the path of the track portion. This is especially useful when the width of the track portion becomes wider or narrower.

Figure 5:
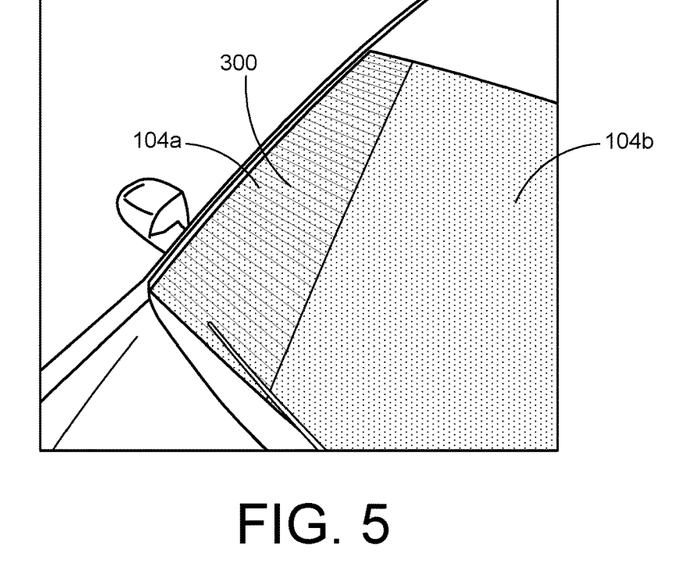
FIG. 5 illustrates a perspective view of an exemplary pair of panels sandwiching a plurality of telescopic ribs, in accordance with an embodiment of the present invention.

FIG. 5 illustrates a perspective view of an exemplary pair of panels sandwiching a plurality of telescopic ribs, in accordance with an embodiment of the present invention. In one aspect, the panels and the ribs may be attached together in a coplanar configuration, so as to move in unison across the window. The panels provide the shading capacity of the device. The telescopic ribs enable the panels to stretch and compress in conformance to the changing width of the window.

Figure 6:
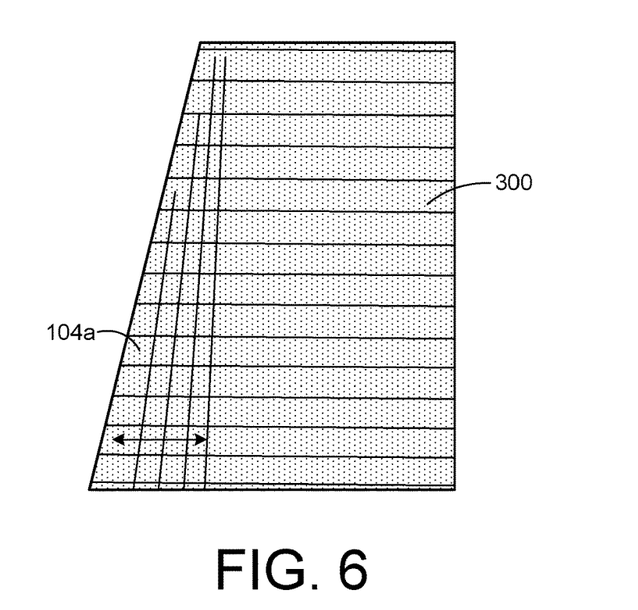
FIG. 6 illustrates a top view of a pair of panels stretching laterally to accommodate a widening lateral perimeter of a window, in accordance with an embodiment of the present invention.

FIG. 6 illustrates a top view of a pair of panels stretching laterally to accommodate a widening lateral perimeter of a window, in accordance with an embodiment of the present invention. In one aspect, the pair of panels may include an inner panel that engages the window and an outer panel that overlays the telescopic ribs. The panels may be configured to stretch. This is especially useful for when the panels must follow the telescopic ribs as they extend and retract in conformance to the angle of the track portion.

Figure 7:
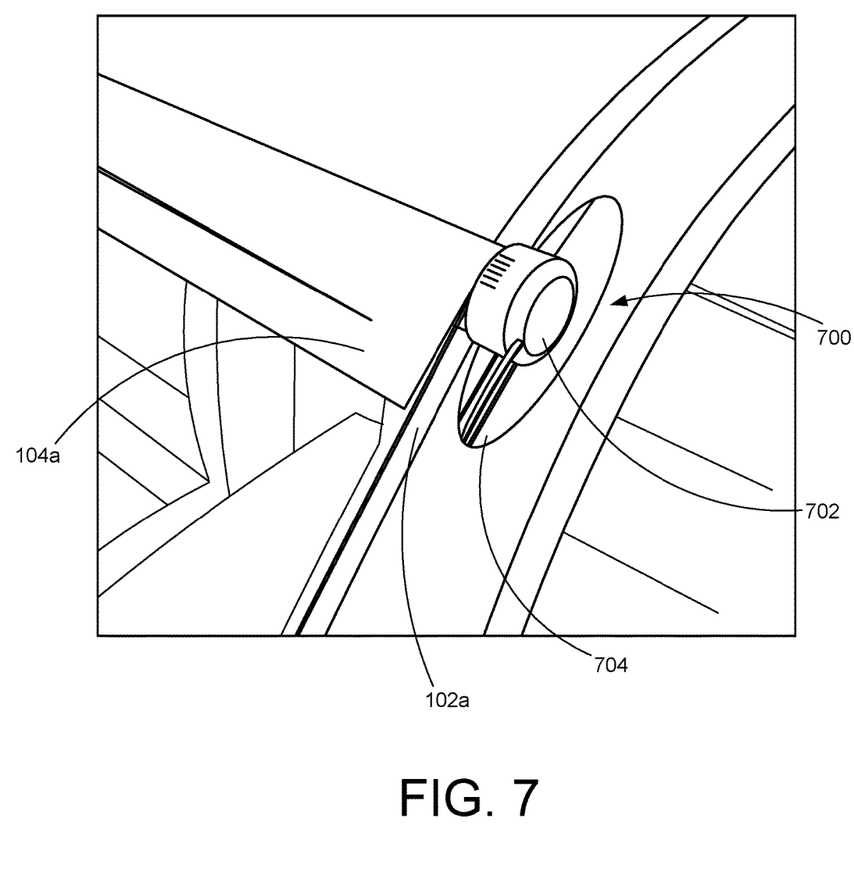
FIG. 7 illustrates a close up view of an exemplary housing portion carrying a panel and telescopic ribs across a window, in accordance with an embodiment of the present invention.

FIG. 7 illustrates a close up view of an exemplary housing portion carrying a panel and telescopic ribs across a window, in accordance with an embodiment of the present invention. In one embodiment, the device may provide a housing portion 700 that is embedded directly above the window, such as above a vehicle's windshield. The housing portion may be configured to help carry the telescopic ribs and the panels across the window. The housing portion may include a housing cavity and a pair of housing ends 702. The housing ends are configured to slidably engage the track portion. The housing cavity may contain the telescopic ribs and the panel. The generally resilient configuration of the telescopic ribs and the panel enable them to roll up inside the housing portion.

In one embodiment, the housing portion may include a cylinder having a ½" diameter that draws in and pays out the telescopic ribs and panels while moving across the window. A motor 704 is integrated in the housing portion. The motor may operatively connect to the control portion.

In some embodiments, the motor may actuate a pulley mechanism that rotatably moves the housing portion up and down the window while simultaneously paying out or drawing in the panels. In one embodiment, the motor is powered by the vehicle battery. Though in one alternative embodiment, the housing portion is non-motorized, and may include a self-retracting, spring-loaded cylinder that may or may not host the panels and telescopic ribs in a non-motorized variation.

Figure 8:
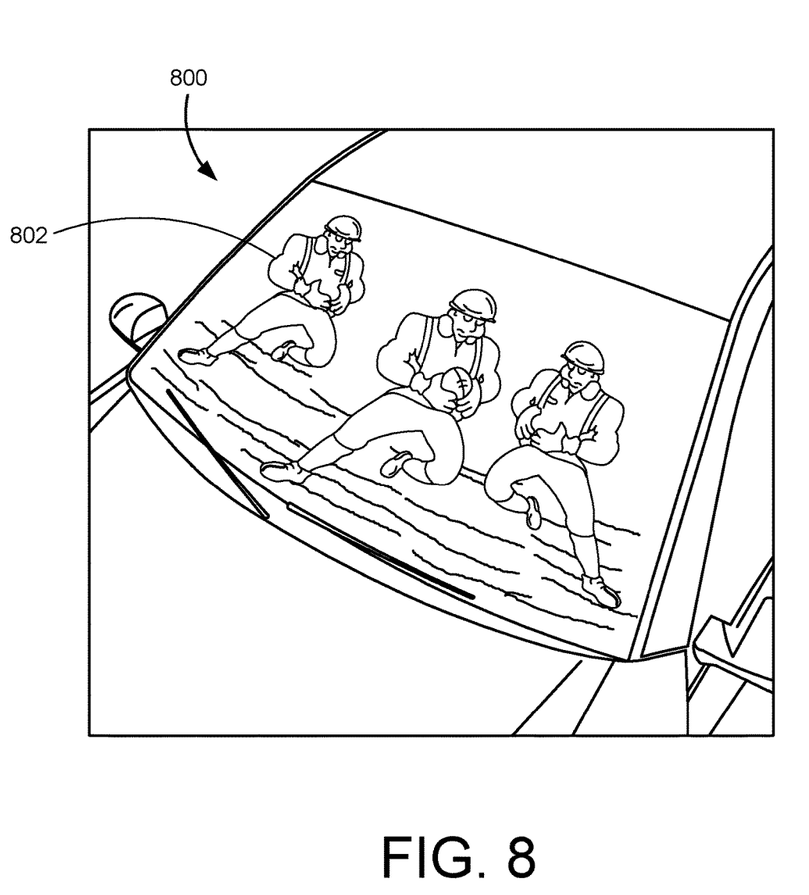
FIG. 8 illustrates a graphical embodiment of an exemplary shading device displaying an image from a panel, in accordance with an embodiment of the present invention.

FIG. 8 illustrates a graphical embodiment of an exemplary shading device displaying an image from a panel. In one aspect, the alternative shading device 800 provides at least one image 802 on the outer panel. This creates a decorative effect. Though in other embodiments, text, patterns, and videos may also display on the panel when viewed from outside the vehicle. The image embodiment operates in substantially the same way as the device described above.

In one alternative embodiment, the device is configured to shade the rear window and the side windows, with each window having a housing portion, panels, telescopic ribs, and track portion. In another alternative embodiment, the shading device is operable in a house or office building window.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 U.S.C. § 112 (1), all claims must be supported by sufficient disclosure in the present patent specification, and any material known to those skilled in the art need not be explicitly disclosed. However, 35 U.S.C. § 112 (6) requires that structures corresponding to functional limitations interpreted under 35 U.S.C. § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to supported aperture a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 U.S.C. § 112 (6) when such corresponding structures are not explicitly disclosed in the foregoing patent specification. Therefore, for any invention element(s)/structure(s) corresponding to functional claim limitation(s), in the below claims interpreted under 35 U.S.C. § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the data of each of these documents discovered during the broadest interpretation search of 35 U.S.C. § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 U.S.C. § 112 (6), which is/are not explicitly disclosed in the foregoing patent specification, Applicant(s) have explicitly prescribed which documents and material to include the otherwise missing disclosure, and have prescribed exactly which data of such patent and/or non-patent documents should be incorporated by such reference for the purpose of satisfying the disclosure requirements of 35 U.S.C. § 112 (6). Applicant(s) note that all the identified documents above which are incorporated by reference to satisfy 35 U.S.C. § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a shading device that controllably covers and uncovers a window of a vehicle according to the present invention will be apparent to those skilled in the art. Various aspects of the invention have been described above by way of illustration, and the specific embodiments disclosed are not intended to limit the invention to the particular forms disclosed. The particular implementation of the shading device that controllably covers and uncovers a window of a vehicle may vary depending upon the particular context or application. By way of example, and not limitation, the shading device that controllably covers and uncovers a window of a vehicle described in the foregoing were principally directed to a shading device that is configured to extend and retract a pair of panels and a plurality of telescopic ribs across a window of a vehicle, while also widening and narrowing the panels and ribs in conformance to the width of the window; however, similar techniques may instead be applied to home and office windows, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A device comprising:
  a pair of track portions, said pair of track portions being configured to enable guided slidable movement along a pair of lateral perimeters of a window;
  a plurality of telescopic ribs, each said plurality of telescopic ribs comprising a pair of rib ends and a cavity, said plurality of telescopic ribs being disposed in a spaced-apart configuration between said pair of track portions, said plurality of telescopic ribs being configured to extend and retract in length, whereby said plurality of telescopic ribs are configured to conform to variable distances between said pair of track portions;
  each said plurality of ribs further comprising a spring portion, said spring portion being disposed in said cavity of said plurality of telescopic ribs, said spring portion being configured to exert a tension outwardly towards said pair of rib ends;
  each said plurality of ribs further comprising a pair of track engagement members, said pair of track engagement members being disposed to extend from said pair of rib ends, said pair of track engagement members being configured to join with said spring portion, wherein said spring portion at least partially biases said pair of track engagement members into slidable engagement with said pair of track portions;
  a pair of panels, said pair of panels being configured to join with said plurality of telescopic ribs, said pair of panels further being configured to at least partially overlay said window, whereby said pair of panels and said plurality of telescopic ribs are configured to enable formation of a generally flat shape being disposed coplanar to said window;
  a housing portion, said housing portion being configured to at least partially contain said plurality of telescopic ribs and said pair of panels, said housing portion further being configured to enable paying out said plurality of telescopic ribs and said pair of panels across said window, said housing portion further being configured to enable drawing in said plurality of telescopic ribs and said pair of panels from said window; and
  a mirror portion, said mirror portion being configured to at least partially provide a reflection in a generally opposite direction relative to said plurality of telescopic ribs and said pair of panels, said mirror portion being disposed in a position that minimizes interference of slidable engagement by said plurality of telescopic ribs and said pair of panels along said pair of track portions.

2. The device of claim 1, wherein said pair of track portions comprises a pair of tracks fastened to said pair of lateral perimeters of said window.

3. The device of claim 2, wherein said window is a front windshield of a vehicle.

4. The device of claim 3, wherein said plurality of telescopic ribs are fabricated from high density polyethylene.

5. The device of claim 4, wherein said plurality of telescopic ribs are disposed in an evenly-spaced horizontal disposition.

6. The device of claim 5, wherein said pair of rib ends comprise a cap.

7. The device of claim 6, wherein spring portion comprises a coil spring.

8. The device of claim 7, wherein said pair of track engagement members comprises free spinning discs.

9. The device of claim 8, wherein said pair of panels are stretchable and flexible.

10. The device of claim 9, wherein said pair of panels comprises an outer panel and an inner panel.

11. The device of claim 10, wherein said outer panel comprises at least one graphic.

12. The device of claim 11, wherein said housing portion comprises a generally cylindrical shape.

13. The device of claim 12, wherein said housing portion has about a half inch diameter.

14. The device of claim 13, further including a motor, said motor being configured to at least partially operate said housing portion.

15. The device of claim 14, further including a control portion, said control portion being configured to actuate said motor.

16. The device of claim 15, wherein said control portion is disposed on a dashboard or a door of the vehicle.

17. The device of claim 16, wherein said mirror portion is a rearview mirror.

18. The device of claim 17, wherein said mirror portion is configured to attach above said front windshield.

19. A device consisting of:
- a pair of track portions, said pair of track portions being configured to enable guided slidable movement along a pair of lateral perimeters of a front windshield;
- a plurality of telescopic ribs, each said plurality of telescopic ribs having a pair of rib ends and a cavity, said plurality of telescopic ribs being disposed in an evenly spaced-apart configuration between said pair of track portions, said plurality of telescopic ribs being configured to extend and retract in length, whereby said plurality of telescopic ribs are configured to conform to variable distances between said pair of track portions;
- wherein each said plurality of ribs has a spring portion, said spring portion being disposed in said cavity of said plurality of telescopic ribs, said spring portion being configured to exert a tension outwardly towards said pair of rib ends, said spring portion comprising a coil spring;
- each said plurality of ribs further includes a pair of track engagement members, said pair of track engagement members are a pair of free spinning discs, said pair of track engagement members being disposed to extend from said pair of rib ends, said pair of track engagement members being configured to join with said spring portion, wherein said spring portion at least partially biases said pair of track engagement members into slidable engagement with said pair of track portions;
- a pair of panels, wherein said pair of panels are an inner panel and an outer panel, said pair of panels being configured to join with said plurality of telescopic ribs, said pair of panels further being configured to at least partially overlay said front windshield, whereby said pair of panels and said plurality of telescopic ribs are configured to enable formation of a generally flat shape being disposed coplanar to said front windshield;
- a housing portion, said housing portion having a substantially cylindrical shape having a housing cavity, said housing cavity being configured to at least partially contain said plurality of telescopic ribs and said pair of panels, said housing portion being configured to enable paying out said plurality of telescopic ribs and said pair of panels across said front windshield, said housing portion further being configured to enable drawing in said plurality of telescopic ribs and said pair of panels from said front windshield;
- a motor, said motor being configured to at least partially operate said housing portion;
- a control portion, said control portion being configured to actuate said motor; and
- a mirror portion, said mirror portion being configured to at least partially provide a reflection in a generally opposite direction relative to said plurality of telescopic ribs and said pair of panels, said mirror portion being disposed in a position that minimizes interference of slidable engagement by said plurality of telescopic ribs and said pair of panels along said pair of track portions, said mirror portion further being configured to attach above said front windshield.

* * * * *